United States Patent [19]
Bonta et al.

[11] Patent Number: 5,758,264
[45] Date of Patent: May 26, 1998

[54] DISPLAY OF GEOGRAPHIC LOCATIONS WITH CORRELATED SIGNAL QUALITY MEASUREMENTS

[75] Inventors: Jeffrey D. Bonta, Arlington Heights; Gerald Gutowski, Palatine, both of Ill.

[73] Assignee: Motorola, Inc., Schaumburg, Ill.

[21] Appl. No.: 680,665

[22] Filed: Jul. 16, 1996

[51] Int. Cl.$^6$ ............................. H04B 1/10; H04B 17/00; H04Q 7/20

[52] U.S. Cl. ........................ 455/67.7; 455/63; 455/456

[58] Field of Search ........................ 455/63, 67.1, 67.6, 455/67.7, 422, 423, 456, 457, 517, 524, 226.1, 226.4; 340/995, 988, 990; 364/514 C, 514 B

[56] References Cited

U.S. PATENT DOCUMENTS

| | | | |
|---|---|---|---|
| 5,095,500 | 3/1992 | Tayloe et al. | 455/456 |
| 5,293,640 | 3/1994 | Gunmar et al. | 455/63 |
| 5,448,761 | 9/1995 | Ushirokawa | 455/67.1 |
| 5,465,289 | 11/1995 | Kennedy, Jr. | 455/422 |
| 5,603,088 | 2/1997 | Gorday et al. | 455/67.1 |

OTHER PUBLICATIONS

"Teletraffic Performance of GSM900/DCS1800 in Street Microcells" by Raymond Steele, John Williams, Derek Chandler, Shirin Dehghan, and Aidan Collard, IEEE Communications Magazine Mar. 1995.

Primary Examiner—Reinhard J. Eisenzopf
Assistant Examiner—Sam Bhattacharya
Attorney, Agent, or Firm—Heather L. Creps

[57] ABSTRACT

A visual presentation of a simulated communication unit moving through a wireless communication system is combined with an audio presentation of speech that a user would hear (311) if the user were placed in the same radio environment. In addition, both audible and visual indicia of RF interference may also be provided (107, 109), with or without audio playback, to aid in designing around interference sources and their intensities. A set of error masks and corresponding audio files are created (305), wherein each file contains the same audio track, but based on speech error masks created at different vehicle speeds and signal to noise ranges. Real-time playback of the audible signal with noise is useful in planning for particular needs of a wireless communication system planner.

14 Claims, 3 Drawing Sheets

DISPLAY OF GEOGRAPHIC LOCATIONS WITH CORRELATED SIGNAL QUALITY MEASUREMENTS

FIELD OF THE INVENTION

This invention relates to radio frequency (RF) communication systems, including but not limited to tools for planning RF communication systems.

BACKGROUND OF THE INVENTION

Cellular systems are known. The complexity of cellular systems has reached a level where by planning and optimizing of these systems to achieve a high level of call quality is an overwhelming task. To provide the ability to plan, parameterize, and control these systems, system modeling tools have been developed. Because of the large amounts of data produced by these modeling tools, it is necessary to use scientific visualization to view the progression of calls in the cellular system being modeled. There is, however, only so much that the human eye can see in a rapidly changing environment Many signal quality measurements, including signal to noise ratio, carrier to interference ratio, bit error rate, and so forth, are currently available for use in planning and controlling design of cellular systems. Such measurements, however, are merely abstract numbers and in a large communication system, provide little assistance to a customer or system planner in determining how exactly the user will perceive audio quality at that point, i.e., whether or not the system will provide adequate sounds at that particular point in the system. Further, the variable of speed of travel of the cellular telephone makes more difficult the determination of the relationship between the signal quality measurements and the audio quality.

In addition, cellular systems today are very often interference limited, which phenomena becomes even more obvious as cell sizes become smaller. In microcellular systems, frequency planning to avoid interference is particularly challenging To make it feasible to evaluate a frequency plan, cellular system simulation tools are necessary to quickly assess the viability of a frequency plan to avoid unacceptable interference.

Accordingly, there is a need for a method of providing meaningful presentation of signal quality measurements for the purpose of designing cellular and other communication systems.

DESCRIPTION OF A PREFERRED EMBODIMENT

The following describes an apparatus for and method of a combination of a visual presentation of a simulated communication unit moving through a wireless communication system with an audio presentation of speech that a user would hear if the user were placed in the same radio environment. In addition, both audible and visual indicia of RF interference may also be provided, with or without audio playback, to aid in designing around interference sources and their intensities. A set of error masks and corresponding audio files are created, wherein each file contains the same audio track, but based on speech error masks created at different vehicle speeds and signal to noise (S/N) ranges. The signal quality measurement, geographic location, and or interference measurement, are stored together, such that by highlighting the particular geographic location on the map, for example by highlighting an object such as a simulated communication unit at the particular geographic location, the corresponding audible signal with noise, audible interference equivalent, and or visual interference designation may be shown or audiblized with the map at the same time the geographic location is highlighted on the map. Real-time playback of the audible signal with noise provides a wireless communication system planner with additional interference and/or audio quality information to use in the optimization of a system.

A method of the present invention comprises the steps of from a receiver moving at a first speed, determining at least one signal quality measurement from a signal received at a first geographic location. A map is displayed, including the first geographic location. The first geographic location is highlighted on the map while providing an indication of the at least one signal quality measurement. The first geographic location may be highlighted on the map as an object such as a simulated communication unit at the first geographic location.

An alternative embodiment further comprises producing a error mask from the at least one signal quality measurement and the first speed. The error mask is combined with an error-free audio signal yielding a corrupted audio signal as the at least one signal quality measurement. The first geographic location is highlighted on the map, for example, by highlighting an object such as a simulated communication unit, while the corrupted audio signal is played In another alternative embodiment the at least one signal quality measurement is an interference measurement of a source of interference.

The indication of the at least one signal quality measurement may be provided as a visual signal emitting from the source of the interference. The indication of the at least one signal quality measurement may be provided as an audible sound that increases in intensity as the interference increases.

Figure 1:
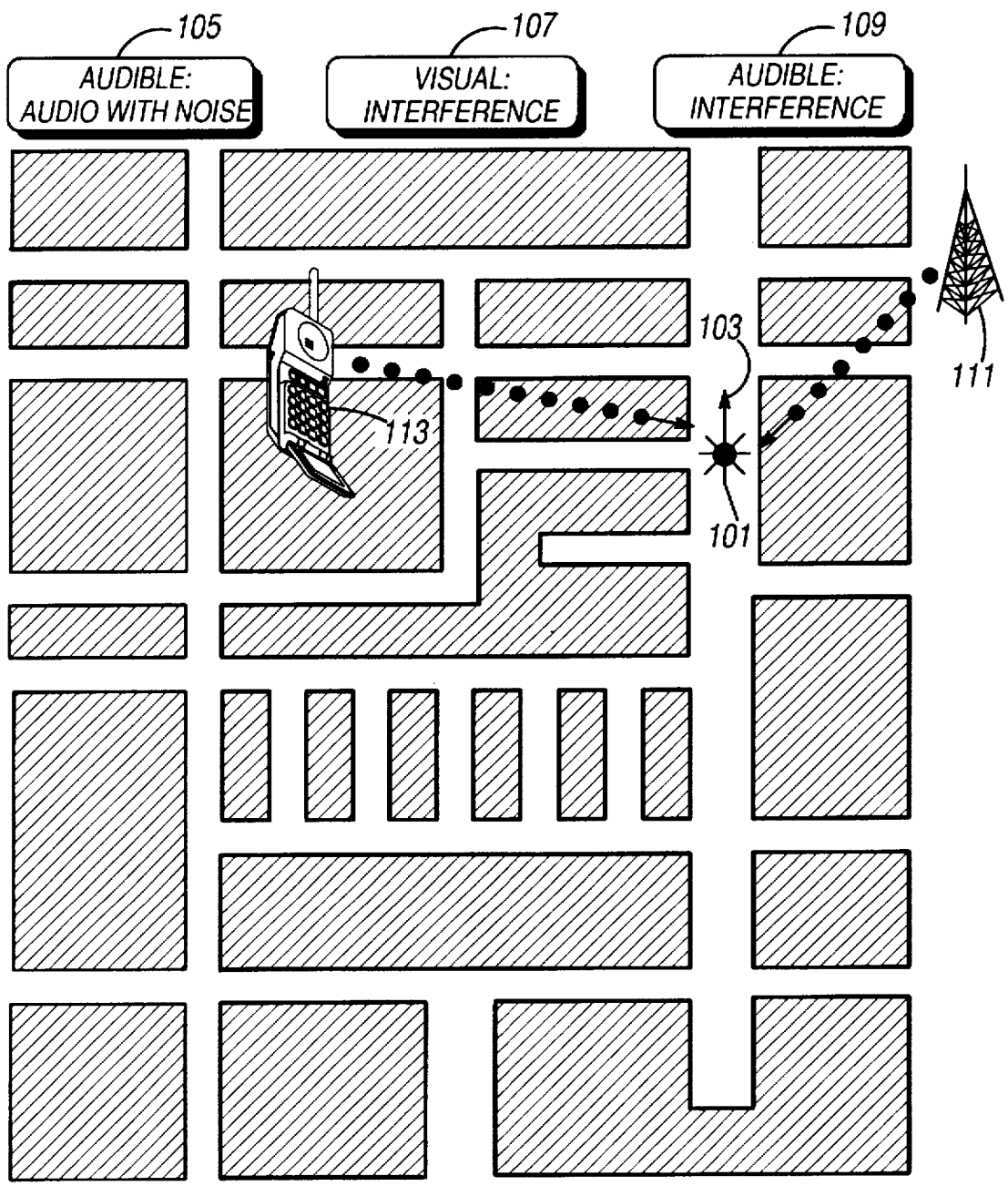
FIG. 1 is a diagram of a display of a map showing geographic locations and interference in accordance with the invention.

A diagram of a display of a map showing geographic locations and interference as well as interference sources is shown in FIG. 1. The display may be provided on a screen for a computer, such as a Silicon Graphics INDIGO 2 Workstation, with XZ or IMPACT graphics capability, and is available from Silicon Graphics. The current geographic location is selected by the user. In the preferred embodiment, the geographic location is chosen by selecting a simulated communication unit that is present at the geographic location. The simulated communication unit is selected because the user wishes to have RF conditions at the geographic location presented to the user in a desired manner For example, the user may place a cursor on the screen over a geographic location on a map and click with a mouse to select the geographic location. In the preferred embodiment, the user selects by clicking with a mouse on a simulated communication unit at a geographic location on the map, for example, in an area of the system that is suspect for interference. In the preferred embodiment, it is optional to display on the map only simulated communication units that exhibit RF conditions below a quality threshold.

The geographic location (or communication unit, as both are crossindexed) is looked up in a table, which table includes rate of speed and signal quality measurements, such as signal to noise ratio, bit error rate, interference measurements, and so forth for the simulated communication unit at the desired geographic location. The data in this table may be assembled from data collected over a period of time, and therefore may represent multiple samples of signal quality measurements and various speeds at a series of geographic locations This data collection may be comprised of field measurements and/or simulated measurements.

The particular geographic location selected by the user is highlighted. For example, the geographic location (or simulated communication unit) is displayed as a specially colored or blinking object such as a light, a vehicle, a communication handset, or other visual indicia 101. In the preferred embodiment, the geographic location is highlighted as a simulated communication unit. Optionally, an arrow 103 may be placed in close proximity to the visual indicia 101 to indicate what direction the user may be going, as selected by the user of the map. In the preferred embodiment, as shown in FIG. 1, the user has three options of presentation of the signal quality measurements. A first button 105 selects an audible playback, which is an error-free audio signal that is combined with a noise signal in the form of an error mask. The error mask is comprised of data taken from field or simulated determinations of signal quality measurements made as a communication unit, such as a cellular telephone, two-way radio, and so forth, travels through the geographic locations represented on the map. The signal quality measurements are stored in a measurement table along with the speed of the vehicle and the particular geographic location at which the measurement was taken. At each time step interval (e.g., every 480 ms or every second), information such as vehicle speed and S/N are stored for use in future playback. Later, an error free audio signal is combined with the error mask yielding a corrupted audio signal.

In the preferred embodiment, the corrupted audio signal may be played back in real time, as the visual indicia 101 moves along the map through the locations where the data in the error mask was taken. For example, if a series of signal quality measurements was taken at 30 miles per hour on Main Street from Oak Street to Maple Street while the communication unit travels northbound, the error mask is played back as the visual indicia 101 moves from Oak Street to Maple Street on Main Street in a northbound direction on the map, at a rate proportional to 30 miles an hour, relating the scaling factor of the street to the map.

Another option available to the user of this display map is a visual presentation of an interference signal, as may be selected by a second button 107. If the visual interference option is selected, a visual indication is emitted from a source of the interference, such as a base station 111 or another communication unit 113, along with an indicia of the intensity of the interference from the source 111 or 113 in a direction toward the highlighted location 101. A higher intensity of interference may be shown by larger indicia that may also be more closely spaced, here shown as small circles that emit from the interference source toward the location 101 currently highlighted. As shown in FIG. 1, the communication unit 113 provides less of a source of interference than the base station 111, as the circles are smaller and further apart.

Figure 2:
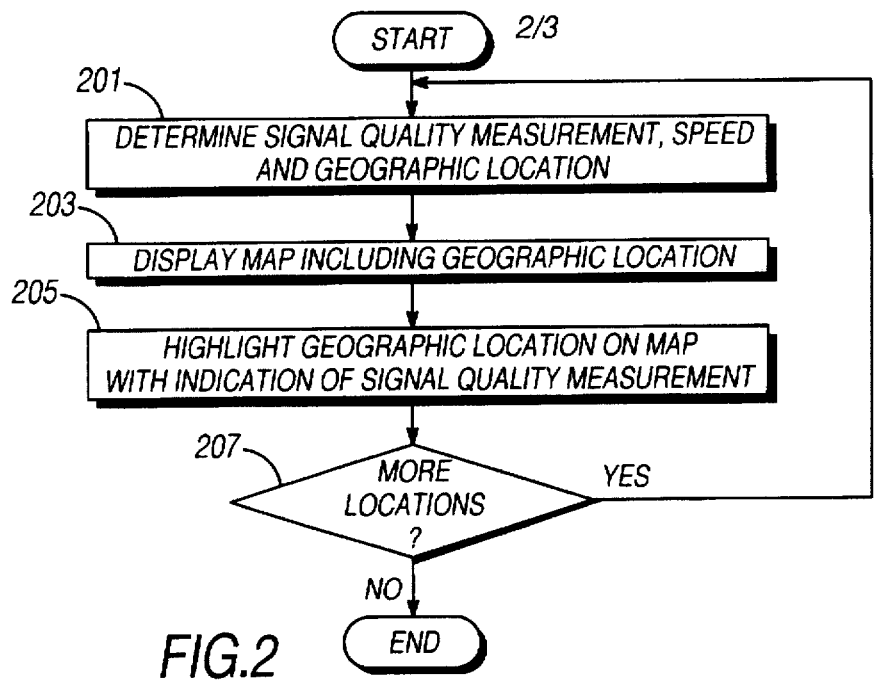
FIG. 2 is a flowchart showing method of providing a display with a signal quality measurement in accordance with the invention.
Figure 3:
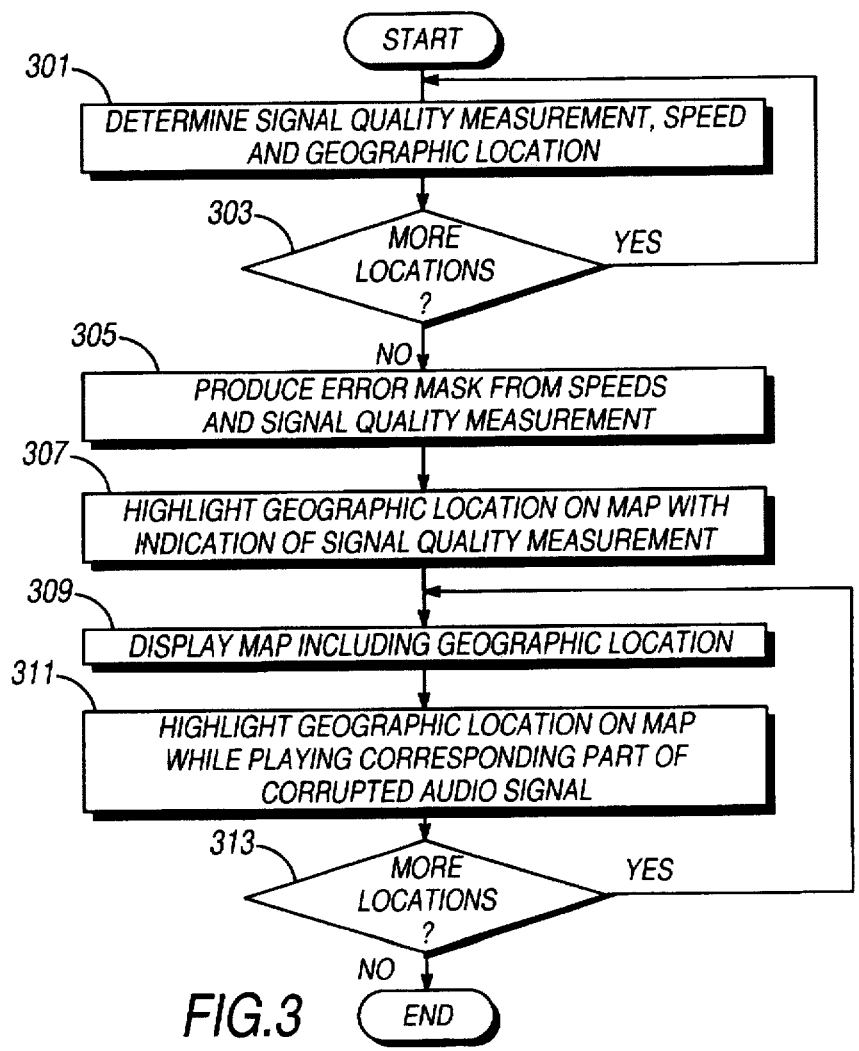
FIG. 3 is a flowchart showing method of providing an audio playback in addition to a visual display in accordance with the invention.

In addition, the user has a choice of selecting an audible interference presentation using a third button 109. A rhythmical sound, such as rain falling or a drum tapping, may be played as the highlighted visual indicia 101 moves through the system As the interference increases, the intensity of the rhythmical sound increases, either by more rain drops falling in the same period of time or more taps on the drum occurring in the same period of time, or by an increase in the loudness of the rhythmical sound, such as the rain or the drum tapping A method of providing a display with a signal quality measurement is shown in the flowchart of FIG. 2. At step 201, a signal quality measurement and speed are determined for a particular geographic location. At step 203, a map is displayed, including the geographic locations of one or more simulated communication units. At step 205, a simulated communication unit at the geographic location is highlighted on the map along with an indication of the signal quality measurement. At step 207, if there are more locations to be viewed, the process continues with step 201, otherwise the process ends A method of providing an audio playback in addition to a visual display is shown in the flowchart of FIG. 3. At step 301, a signal quality measurement and speed are determined for a simulated communication unit at a particular geographic location. In the preferred embodiment, the signal quality measurement is a signal to interference plus noise measurement, although other signal quality measurements such as bit error rate, frame error rate, received signal strength indication, mid-amble correlation level synchronization words or block error rate may also be used. At step 303, if there are more locations to be viewed, the process continues with step 301, otherwise the process continues with step 305. At step 305, an error mask is produced from the speeds and signal quality measurements taken, as correlated with the geographic locations at which the speeds and signal quality measurements were taken. At step 307, the error mask is combined with an error free audio signal yielding a corrupted audio signal At step 309, a map is displayed including a simulated communication unit at a particular geographic location At step 311, the simulated communication unit at the particular geographic location is highlighted on the map while playing the corresponding part of the corrupted audio signal. The corresponding part of the corrupted audio signal is the part of the signal that is created using the error mask that was determined by field or simulated data corresponding to the geographic location that is highlighted at step 311. If there are more locations to be shown at step 313, the process continues with step 309, otherwise the process ends. The geographic location may be shown as a moving highlighted visual indicia 101 that travels, proportional to the ratio of the map to the actual geographic locations, at the same speed as the communication unit was travelling when information in the error mask was taken. As a result, by moving the cursor or visual indicia 101 through the communication system at the speed the data was taken, one can hear what audio would sound like as if one were actually driving through that particular area at that speed.

Figure 4:
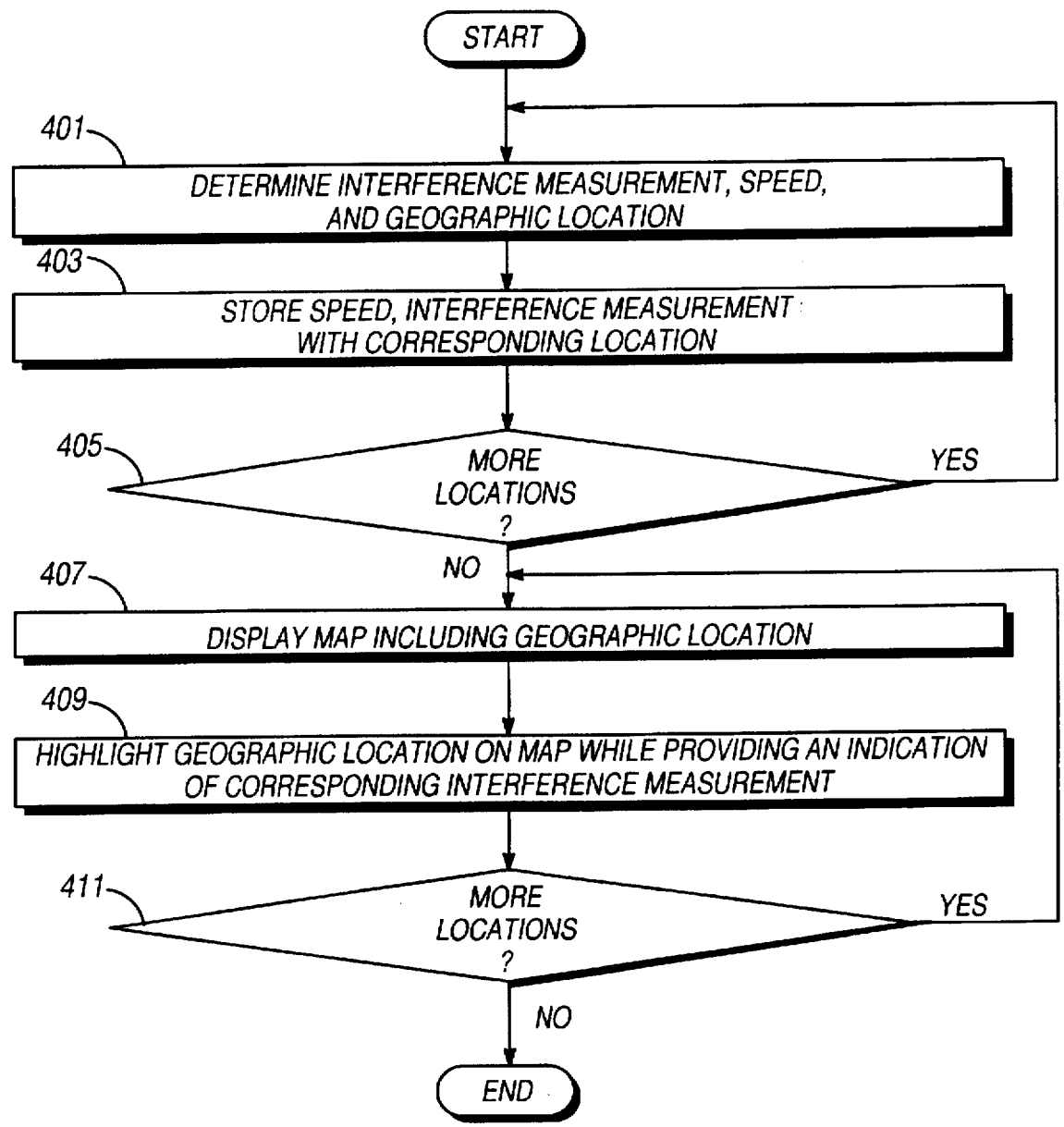
FIG. 4 is a flowchart showing method of providing indicia of a signal quality measurement that is an interference measurement in accordance with the invention.

A method of providing indicia of a signal quality measurement that is an interference measurement is shown in the flowchart of FIG. 4. At step 401, an interference measurement and speed are determined for a particular location as may be travelled by a simulated communication unit. At step 403, the speed and interference measurement are stored corresponding with the location. If there are more locations to be stored at step 405, the process continues with step 401.

If there are no more locations at step 405, the process continues with step 407. At step 407, a map is displayed including a selected simulated communication unit at a selected geographic location. At step 409, the geographic location is highlighted on the map while providing an indication of the corresponding interference measurement for that geographic location. In the preferred embodiment, the geographic location is highlighted on the map by highlighting a simulated communication unit at the geographic location. The indication of the corresponding interference measurement may be a visual indication or an audible indication. A visual indication may be a series of objects emitting from a source, such as base station 111 or communication unit 113 from FIG. 1, and some form of the visualization would provide the intensity of the interference. For example, the objects emitting from the base station 111 may be darker, larger, and/or closer together than the objects emitted from the communication unit 113, which are smaller and further apart, indicating that there is more intense interference source in the base station 111 than in the communication unit 113. Alternatively, an audible interference indication may be provided in addition to or in place of a visual interference indication The audible indication of interference may be a rhythmical sound, such as rain falling or a drum tapping, and may be played as the highlighted visual indicia 101 moves through the system. As the interference increases, the intensity of the rhythmical sound increases, either by more rain drops falling in the same period of time or more taps on the drum occurring in the same period of time, or by an increase in the loudness of the rhythmical sound, such as the rain or the drum tapping.

The preferred embodiment of the present invention provides three modes of audio playback: 1) static snapshot; 2) static time-sequenced; and 3) dynamic time-sequenced. Audio playback is made possible with a set of audio files that are created in advance. With the use of an RF modem (or radio link) simulator common in the digital cellular industry, error masks may be created that capture the impact of bit errors in an arbitrarily long correlated set of speech frames. In the present invention, a separate error mask is produced for several ranges of vehicle speeds and several ranges of S/N. These error masks can individually be used to create a corrupted audio file by applying the error mask to an original (non-impaired) digitally encoded audio track. Audio files are created for a range of S/N levels and a range of vehicle speeds for each time step interval as shown in the following table:

|  | 15–25 km/hr | 25–35 km/hr |
| --- | --- | --- |
| 10–11 dB S/N | File 1 | File 7 |
| 12–13 dB S/N | File 2 | File 8 |
| 14–15 dB S/N | File 3 | File 9 |
| 16–17 dB S/N | File 4 | File 10 |
| 18–19 dB S/N | File 5 | File 11 |
| 20–21 dB S/N | File 6 | File 12 |

In the static snapshot mode or the static time-sequenced mode, the visual indicia 101 is halted at a particular geographic location that is of interest. At this time, the user may request audio playback either based on a snapshot of the current S/N and vehicle speed parameters (in mode 1) or based on the time-sequenced stream of S/N and vehicle speed parameters collected since the beginning of the call (in mode 2).

In the static snapshot mode of playback, an audio track is selected from a single file created for a specific vehicle speed and S/N, and played through a codec available on workstations, such as those available on a Silicon Graphics INDIGO 2 Workstation For the static time sequenced mode of playback and with the use of a time-sequenced stream of S/N and vehicle speed parameters, it is possible to splice together segments of speech (e.g., 1 second samples) to produce a continuous audio track using sound editor tools, such as those available on a Silicon Graphics INDIGO 2 workstation. This audio track can be played back through a codec available on the workstation. In the following example, a GSM (Group Specialized Mobile) cellular call is simulated in a manner known in the art. In the example, the call is 60 seconds in length. During the course of the example call, a vehicle slows from 30 km/hr to 20 km/hr while S/N drops from 20 dB to 12 dB. In addition, for every 5 seconds of the length of the call, the S/N ratio drops 2 dB. After 30 seconds, the vehicle speed transitions from the 25–35 km/hr range to the 15–25 km/hr range.

Using the static time sequenced mode of playback in which the user requests audio playback of this simulated GSM call after the visual indicia 101 is halted at a particular geographic location that is of interest, five-second samples are taken from each of the appropriate audio files (from the table above) that correspond to the current time of the call (i.e., an index into a file based on the time of the call). The appropriate file is selected based on the vehicle speed and S/N ratio at the audio playback time. These 12 samples are concatenated together to produce an audio file that is 60 seconds in length.

In the dynamic time sequenced mode of playback of a call in the preferred embodiment, the user requests audio playback of the GSM call without halting the dynamically moving visual indicia 101 at a particular geographic location that is of interest. In this example, based on the speed of the Silicon Graphics INDIGO 2 Workstation, it is known that visual playback requires 1.3 seconds per time step interval To allow for variations in speed, 1.5 seconds is chosen for the playback time of a simulated 1 second time step interval. Therefore, when the user selects audio playback, the audio playback time is increased by 50% for each time step interval to match the visual playback time which is now 90 seconds. Thus, an audio playback file is constructed with 12 audio samples of length 7.5 seconds, which are concatenated together. Visualization playback is synchronized to 1.5 second triggers to account for temporary decreases or increases in playback time.

In the preferred embodiment, in order to minimize audible transitions between samples being concatenated from different files, a blend of the two adjoining samples is performed by fading the old sample out while fading the new sample in. This blend occurs over 200–300 ms. As the playback of the call progresses, it is possible for the user to pause the visualization, although the currently playing concatenated audio file will stop, and no audio will be present.

The present invention may be implemented by modifying a system, such as that described in the article "Teletraffic Performance of GSM900/DCS1800 in Street Microcells" by Raymond Steele et al. in the March 1995 issue of IEEE Communications Magazine, to provide the method and apparatus as described herein.

The present invention provides a unique visual presentation of the source of interference as well as audio feedback for the severity of the interference in a manner that is readily discernible in real time by a user without having to sift through extensive amounts of raw data. Further, the present invention provides a mechanism for quickly assessing the viability of a frequency plan to avoid unacceptable interference. The method described is advantageous not only to examine audio quality prior to deployment of a communication system, but also to iteratively test/examine one or more geographic locations in a region of interest. The present method and apparatus makes feasible test or examination situations where replanning, retuning, and re-parameterization of a deployed cellular system is impractical.

The present invention provides a method and apparatus for processing the large amount of data produced by cellular system modelling tools using a visualization tool that provides the user with a visual and/or audible presentation of the progression of calls in the communication system being modelled. The visualization method as provided by the present invention assists the user in capturing and analyzing the data associated with a call in a way that allows new information to stand out. Both uplink and downlink interference problems are pointed out visually using the interference presentation features of the present invention, permitting the user to evaluate whether a current frequency plan needs to be reworked, or whether existing handover or power control algorithms need to be improved to avoid or tolerate the interference.

What is claimed is:

1. A method comprising
   detecting a signal;
   at a first geographic location, determining, by a receiver moving at a first speed, at least one signal quality measurement of the signal;
   based on the at least one signal quality measurement and the first speed, estimation a distortion of the detected signal;
   producing an error mask based on the estimated distortion;
   combining the error mask with an error-free audio signal yielding a corrupted audio signal;
   displaying a map including the first geographic location; and
   highlighting on the map the first geographic location while playing the corrupted audio signal.

2. The method of claim 1, wherein the at least one signal quality measurement is an interference measurement of a source of interference.

3. The method of claim 2, wherein the indication of the at least one signal quality measurement is provided as a visual signal emitting from the source of the interference.

4. The method of claim 2, wherein the indication of the at least one signal quality measurement is provided as an audible sound that increases in intensity as the interference increases.

5. The method of claim 1, wherein the first geographic location is highlighted on the map as a simulated communication unit at the first geographic location.

6. A method comprising the steps of:
   at each of a plurality of geographic locations, determining a corresponding speed and a corresponding signal quality measurement from a moving receiver;
   storing each of the plurality of geographic locations along with its corresponding speed and its corresponding signal quality measurement, yielding a measurement table;
   producing an error mask from the measurement table;
   combining the error mask with an error-free audio signal yielding a corrupted audio signal;
   displaying a map including the plurality of geographic locations; and
   while playing the corrupted audio signal, highlighting on the map each of the plurality of geographic locations corresponding to a protion of the error mask.

7. The method of claim 6, wherein the corresponding signal quality measurement is an interference measurement of a source of interference.

8. The method of claim 7, wherein the indication of the signal quality measurement is provided as a visual signal emitting from the source of the interference.

9. The method of claim 7, wherein the indication of the signal quality measurement is provided as an audible sound that increases in intensity as the interference increases.

10. The method of claim 6, wherein each of the plurality of geographic locations is highlighted on the map as a simulated communication unit at the first geographic location.

11. A method comprising the steps of:
    from a receiver moving at a first speed, determining at least one signal quality measurement from a signal received at a first geographic location;
    producing a error mask from the at least one signal quality measurement and the first speed;
    combining the error mask with an error-free audio signal yielding a corrupted audio signal;
    displaying a map including the first geographic location;
    highlighting on the map the first geographic location while playing the corrupted audio signal.

12. The method of claim 11, wherein the first geographic location is highlighted on the map as a simulated communication unit at the first geographic location.

13. A method comprising the steps of:
    at each of a plurality of geographic locations, determining a corresponding speed and a corresponding signal quality measurement from a moving receiver;
    storing each of the plurality of geographic locations along with its corresponding speed and its corresponding signal quality measurement, yielding a measurement table;
    producing a error mask from the measurement table;
    combining the error mask with an error-free audio signal yielding a corrupted audio signal;
    displaying a map including the plurality of geographic locations;
    while playing the corrupted audio signal, highlighting on the map each of the plurality of geographic locations corresponding to a portion of the error mask.

14. The method of claim 13, wherein each of the plurality of geographic locations is highlighted on the map as a simulated communication unit at the first geographic location.

* * * * *